Oct. 1, 1940. R. P. McNAUGHT 2,216,127
PERISHABLE MARK FOR FROZEN FOODS
Filed Sept. 24, 1937 2 Sheets-Sheet 1

INVENTOR.
ROBERT P. McNAUGHT
BY Munn, Anderson & Liddy
ATTORNEYS.

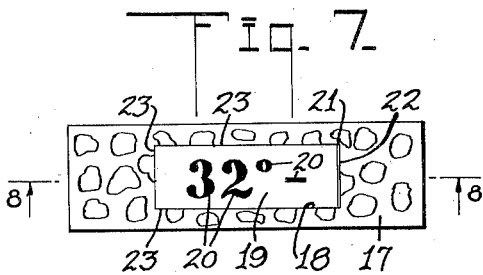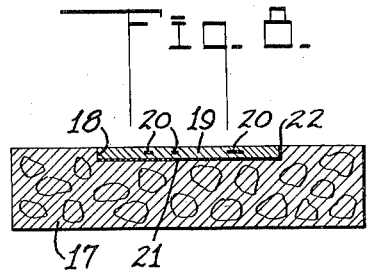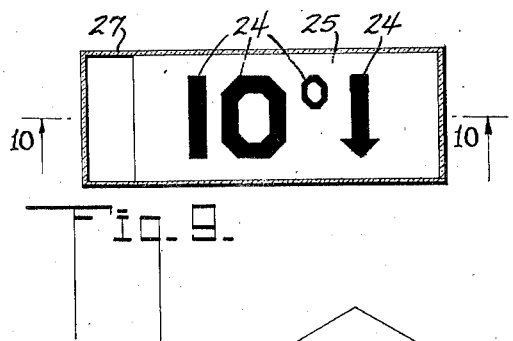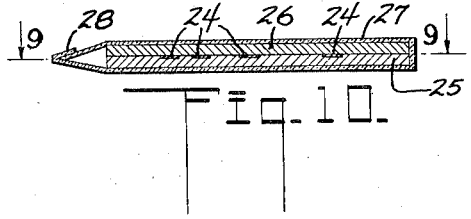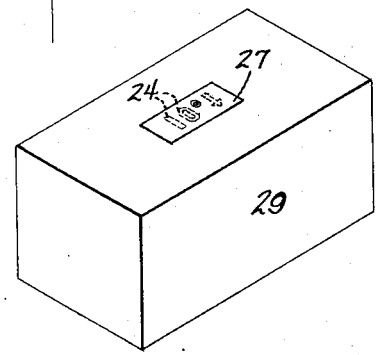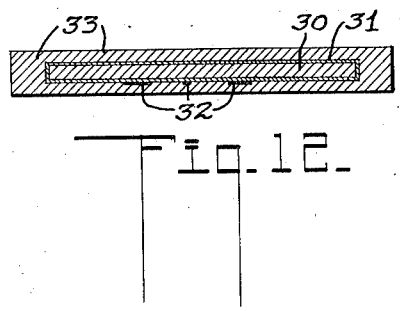

Patented Oct. 1, 1940

2,216,127

UNITED STATES PATENT OFFICE 2,216,127

PERISHABLE MARK FOR FROZEN FOODS

Robert P. McNaught, San Francisco, Calif.

Application September 24, 1937, Serial No. 165,532

7 Claims. (Cl. 99—192)

My invention relates to improvements in a perishable mark, and it consists of the combinations, constructions and arrangements hereinafter described and claimed and in the steps hereinafter described.

An object of my invention is to provide an improvement in forming the frozen mark over that shown in my co-pending application Serial No. 146,819, filed June 7, 1937. In the co-pending application I show a method for forming a perishable mark in a block of ice and the block in turn is frozen to the cake of ice enclosing the edible product.

In the present form of the invention I provide a method for spraying the mark onto a surface of ice and then covering the mark with a second layer of ice of the desired thickness. The thickness of the second layer of ice determines the amount of time the frozen product can be left at an ordinary room temperature before the mark will melt. The spraying of the mark onto the surface of ice by means of a spray nozzle and stencil can be more quickly accomplished than by molding grooves in a block of ice and filling these grooves with a freezable material.

I further provide novel means for not only spraying a mark onto the frozen articles, but in also causing the mark to indicate the temperature at which the product must be kept in order to prevent it from deteriorating. The mark not only can show the temperature at which the product must be kept, but the colored solution used for forming the mark can be controlled so that it will melt at a desired temperature. As an example, alcohol or glycerine may be mixed with food coloring in varying proportions so that the resulting mixtures will freeze at different temperatures. A solution composed of 9.5 parts of alcohol by volume, 10 parts of a food coloring matter, such as Shillings blue, and 16 parts of water, will freeze at +5° F. and will melt at any temperature above this mark. A perishable mark sprayed onto an ice surface with this solution can indicate the temperature +5° F. and the frozen food must be maintained at this temperature in order to prevent the mark from becoming blurred. So long as the mark remains distinct the purchaser will know that the goods have been maintained at the temperature indicated.

It is possible to form the mark in a block of ice and place this block in a recess formed in the frozen product and to separate the block of ice from the frozen product by a separating member such as a layer of Cellophane. This layer of Cellophane may be disposed between the lower surface of the block containing the mark, and the frozen product and part of the member may be disposed along one edge of the block and the adjacent wall of the recess. The other three edges of the block may be temporarily adhered to the frozen product by applying a little water between the adjacent frozen surfaces and this water will instantly freeze and fuse the two surfaces together. The block containing the perishable mark may be removed before the frozen product itself is thawed out by merely breaking the ice along the three edges and lifting the block out. In this way the solution forming the mark can not mix with the frozen product when the latter is thawed.

Another way of preventing the perishable mark from mixing with the frozen product during the thawing process is to dispose the block of ice containing the perishable mark in a Cellophane bag or other transparent impervious container. Should the mark melt, the bag will retain all of the fluid.

It is possible to apply the mark to a number of sections, each section conatining a frozen product. For example, oysters may be placed in a container and partitions such as Cellophane be placed in the container, these partitions extending substantially to the bottom of the container. When the product is frozen the partitions will divide the frozen product into a number of sections, each of which will contain a perishable mark. It is possible to break off one or more sections at a time adjacent to the Cellophane partitions, because the actual amount of ice binding the sections together adjacent to the partitions is very small and may be easily broken. Where strawberries or other fruit are frozen, they may be retained in their original baskets and enclosed in a Celophane wrapper. The mark in this instance may be applied to a layer of ice formed by spraying water onto the bottom of the basket.

Other objects and advantages will appear in the following specification, and the novel features of the device will be particularly pointed out in the appended claims.

My invention is illustrated in the accompanying drawings forming a part of this application, in which.

Figure 7 illustrates a Cellophane wrapper separating a perishable mark from the frozen product so that the perishable mark may be removed prior to the thawing out of the product;

Figure 8 is a section along the line 8—8 of Figure 7;

Figure 9 is a section along the line 9—9 of Figure 10, and illustrates the placing of a perishable mark in a transparent and impervious container;

Figure 10 is a section along the line 10—10 of Figure 9;

Figure 11 is an isometric view showing the mark, illustrated in Figures 9 and 10, placed in a box containing a perishable product such as turkeys, rabbits, etc.; and Figure 12 is a sectional view showing the perishable mark applied to a fish.

Figure 1:
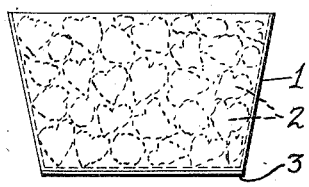
Figure 1 is a side elevation of a basket of frozen strawberries showing a layer of ice formed on the bottom of the basket.
Figure 2:
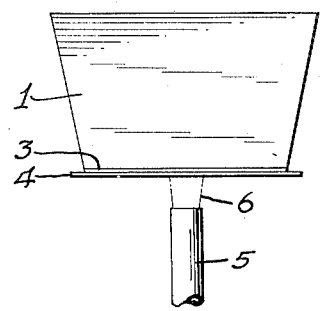
Figure 2 illustrates a method of spraying a mark upwardly onto the bottom of a basket by means of a spray nozzle and a stencil.

In carrying out my invention I show a box 1 containing strawberries 2 or other fruit. The strawberries are preferably quickly frozen by placing them in extremely low temperatures. Water is then sprayed upon the bottom of the box while the box is maintained at this temperature and will quickly freeze into a layer of ice indicated at 3. This layer of ice receives the perishable mark which may be sprayed onto the box by directing the spray upwardly against the bottom of the box. A stencil 4 is placed against the sheet of ice 3 and a spray nozzle, indicated generally at 5 in Figure 2, sprays a colored liquid 6 upwardly against the stencil 4. The openings 7 in the stencil will permit the fluid to strike against the layer of ice 3 and this fluid will be instantly frozen. By spraying upwardly, as shown in Figure 2, any excess fluid will drop away from the layer of ice and from the stencil and this will cause the stencil to form a perfect mark on the ice layer 3. The spraying of the mark is also done at a low temperature in order to insure quick freezing.

Figure 3:
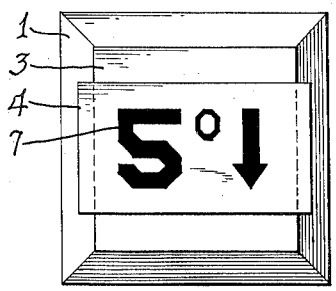
Figure 3 is a bottom plan view of Figure 2.
Figure 4:
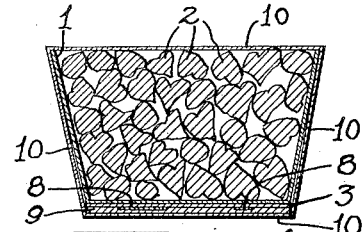
Figure 4 is a transverse section through the basket showing it enclosed in a Cellophane wrapper.

In Figure 3 I show the stencil 4 provided with openings 7 indicating 5° F., above zero, the direction of the arrow indicating that the temperature must be kept at +5° F. or lower. After the mark 8, see Figure 4, has been stenciled on the layer of ice 3, the stencil is removed and then one or more layers of ice 9 is formed over the mark by spraying or dipping. The entire box and perishable mark may now be wrapped in a transparent material such as Cellophane indicated at 10.

The mark shown in Figure 3 indicates that the berries must be kept at a temperature of 5° F. above zero or lower. The liquid forming the mark can be regulated to melt at any temperature above that indicated by the mark itself. The solution forming the mark may contain either alcohol or glycerine. As already given in the first part of the specification, the 9.5 parts of alcohol, 10 parts of food coloring, called Shillings blue, and 16 parts of water, make up a solution that will freeze at +5° F. and that will melt at any temperature above this point. It is also possible to use 5 parts by volume of glycerine, 10 parts of food coloring such as Shillings blue, and 12 parts of water to make a mixture that will freeze at the same temperature of +5° F., and that will melt at any temperature above this point. If the mixture given does not freeze at 5° F., a teaspoonful or two of water may be added to cause the solution to freeze at the desired temperature. Should freezing take place too soon, then a teaspoonful or two of alcohol or glycerine may be added as the case may be, in order to obtain the desired results.

Figure 5:
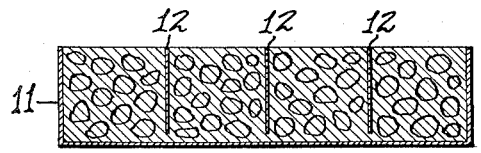
Figure 5 illustrates the method of freezing a perishable product in a block of ice separated into sections by partitions.
Figure 6:
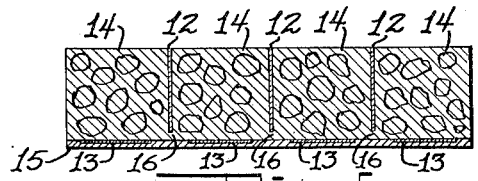
Figure 6 shows the frozen product illustrated in Figure 5 and with the perishable marks applied to the sections.

In Figures 5 and 6 I show a container 11 divided into compartments by partitions 12. These partitions are preferably made of Cellophane and do not extend to the bottom of the container. A perishable product such as oysters and their juice may be placed in the compartments formed in the container by the partitions, and then may be frozen. The resulting frozen product may be removed from the container and then the perishable marks 13 may be added to each section 14 in the manner shown in Figure 2. A layer of ice 15 covers the perishable marks.

The frozen oysters may be shipped to the required destination and the purchaser may purchase one or more of the sections 14. The partitions 12 separate the sections with the exception of a small joining piece of the frozen product indicated at 16 that connects the sections together. The small connecting portions 16 permit the sections to be broken off readily from the remaining product. In this simple way oysters may be purchased and carried home in a frozen state which obviates the usual procedure of carrying the oysters in a sloppy condition in a carton.

In Figures 7 and 8 I show a frozen food product 17 with a recess 18 therein. A block of ice 19, containing a perishable mark 20, is placed in the recess and is separated from the perishable product 17 by a Cellophane partition 21. The Cellophane partition extends between the bottom of the block of ice 19 and the bottom of the recess 18. Figure 8 shows a piece of the Cellophane bent at 22 and extending to the top of the frozen product. The other three sides 23 of the block of ice 19 are frozen to the adjacent sides of the recess 18 by applying water between the opposed sides. This water will instantly freeze because of the low temperature of the food product 17.

By separating the bottom and one side of the block 19 from the food product 17 by the partition 21, it is possible to remove the block of ice 19 before the perishable product 17 is thawed out. It is only necessary to break the ice seal between the three sides 23 of the ice block and the adjacent sides of the perishable product, and then lift the ice block from the perishable product by means of the Cellophane partition 21. The perishable mark will therefore not mix with the food contained in the block 17 when the latter is melted.

In Figures 9 to 11 inclusive, I show another means of preventing the perishable mark from mixing with the frozen food. The mark 24 is formed on a block of ice 25, see Figure 10 and a second block of ice 26 is placed over the first block so as to cover the mark. Water is applied along one or more edges of the two blocks of ice and then will adhere to each other and will constitute a single block. The block of ice containing the perishable mark is then placed in a Cellophane bag indicated at 27. The bag is sealed at 28 so in case the block melts, all of the fluid will be retained in the bag.

This form of mark is especially adapted to be placed in a visible place on boxes 29, see Figure 11, containing frozen products. The bag 27 is secured to the box 29 and the mark indicates the temperature at which the product in the box must be maintained in order to keep the product indefinitely without spoiling. Should the temperature, for example, go above +10° F., then the perishable mark, shown in Figure 11, will melt and will indicate this fact. The melted mark, however, will be prevented from flowing onto the food product, because it will be retained in the bag.

In Figure 12 I indicate a method of marking frozen fish. A piece of fish is indicated at 30 and this is quickly frozen at a low temperature and then is dipped into water to provide a glazed surface 31 over the fish. The perishable mark 32 is then sprayed onto the surface and then the entire product is covered with a layer of ice 33 of the desired thickness by spraying and dipping into water. The thickness of the layer of ice determines the length of time the product may be kept at a normal room temperature before the fish will start to thaw. The layer of ice 33 must first melt before the temperature of the piece of fish 30 will raise to a point where spoiling will commence.

It is also possible to prepare frozen fruit salads and mark these with an edible product so that the thawing out of the salad and mark may be accomplished without any harm to the salad. One of the sections 14 in Figure 6, can represent a frozen fruit salad in which the fruit has been placed in a syrup or gelatin having the desired flavor. Before the freezing is accomplished, a piece of fruit such as half a pear can be placed at the bottom of the container 11 with its cut side resting on the container bottom. The subsequent freezing will cause the white surface of the pear to appear at the bottom of the frozen product. A thin layer of ice will cover the pear and if desired this ice layer may be thickened by spraying additional water onto the frozen product while still maintaining the product at a low temperature.

The liquid used in spraying the mark onto the ice that covers the pear may be made from an edible material such as blackberry juice mixed with a sufficient quantity of alcohol to melt at a given temperature. The solution may be sprayed onto the frozen product in the manner shown in Figure 2 and the resulting mark will be clearly seen because it is superimposed over the white surface of the pear. The pear will act as a white background for the mark. The mark may be covered with a protecting layer of ice which is formed on the product by spraying water thereon or dipping the product in water.

When the product is thawed out, the mark will disappear into the salad and will cause no harm because it is composed solely of blackberry juice and alcohol. The entire mark does not contain more than one or two drops of liquid.

While I have shown only the preferred forms of my invention, it should be understood that various changes or modifications may be made within the scope of the appended claims without departing from the spirit of the invention.

I claim:

1. The herein described method of marking a frozen product which consists in spraying water onto the container carrying the product, to form a layer of ice thereon by the water contacting with the frozen product, placing a stencil on the ice surface and holding the container so that the ice surface and stencil lie in a horizontal plane, and spraying a colored liquid upwardly against the stencil for applying a freezable mark to the layer of ice, the mark freezing when contacting with the layer of ice.

2. The herein described method of marking a frozen product which consists in spraying water onto the container carrying the product, to form a layer of ice thereon by the water contacting with the frozen product, placing a stencil on the ice surface and holding the container so that the ice surface and stencil lie in a horizontal plane, spraying a colored liquid upwardly against the stencil for applying a freezable mark to the layer of ice, and in spraying water over the layer of ice and mark after removing the stencil, for covering the mark with a protecting coating of ice, the two layers of ice and the mark forming a homogeneous frozen unit.

3. The herein described steps of applying a perishable mark to a quick frozen product that will indicate a predetermined temperature below freezing and will melt without contaminating the food when subjected to any higher temperature, which consists in mixing an edible anti-freeze solution with food coloring in proportions to cause the solution to freeze at a desired temperature below the freezing temperature of water, and in forming a mark on the frozen product with the solution that will indicate the temperature at which the mark will melt.

4. The herein described process of freezing an edible product in connected sections that may be broken off at will, which consists in pouring the product mixed with a freezable solution into a tank containing removable partitions that do not cover the entire cross sectional area of the tank, freezing the solution and product while in the tank, and in removing the resulting frozen product and embedded partitions, the sections of the product formed by the partitions being readily broken off due to the limited amount of frozen material connecting the sections together.

5. The herein described method of freezing and marking an edible product which consists in quick freezing the product at a low temperature, immersing the frozen product in water for providing the product with a glazed layer of ice, applying a food coloring mark directly to the glazed surface, and in covering the mark and glazed surface with a layer of ice of the desired thickness.

6. A frozen tell-tale edible mark meltable at a desired temperature well below freezing and comprising fruit or berry juice or any liquid food and a sufficient quantity of a low freezing edible solution added to the juice to cause the mark to melt at a predetermined point well below freezing.

7. The herein described method of marking a frozen product, consisting of applying water onto a nethermost portion of a container of said product to form a layer of ice on said portion, placing a stencil on the ice surface and holding the container so that the ice surface and stencil are positioned horizontally, and directing a marking liquid consisting of an edible anti-freeze solution with food coloring in proportions to cause the solution to freeze at a desired temperature below the freezing temperature of water against the stencil thereby to freeze to the ice surface in the openings of the stencil and form a clearly delineated and contrasting mark.

ROBERT P. McNAUGHT.